United States Patent [19]

Yamamoto

[11] 3,708,621

[45] Jan. 2, 1973

[54] VERTICAL SYNCHRONIZING SYSTEM

[75] Inventor: Keisuke Yamamoto, Hirakata, Japan

[73] Assignee: Matsushita Electric Industrial Co., Ltd., Kadoma-shi, Osaka, Japan

[22] Filed: Feb. 3, 1971

[21] Appl. No.: 112,290

[30] Foreign Application Priority Data

Feb. 13, 1970 Japan ....................45/12713
Feb. 13, 1970 Japan ....................45/12714
Feb. 13, 1970 Japan ....................45/12715

[52] U.S. Cl. ....................178/69.5 TV
[51] Int. Cl. ....................H04n 5/06
[58] Field of Search ....................178/69.5 TV, 69.5 R

[56] References Cited

UNITED STATES PATENTS

| | | | |
|---|---|---|---|
| 2,752,424 | 6/1956 | Pugsley | 178/69.5 TV |
| 3,526,714 | 9/1970 | Fisk et al. | 178/69.5 TV |
| 3,336,440 | 8/1967 | Blake et al. | 178/69.5 TV |
| 3,567,860 | 3/1971 | Oliver et al. | 178/69.5 TV |

*Primary Examiner*—Richard Murray
*Attorney*—Stevens, Davis, Miller & Mosher

[57] ABSTRACT

A vertical synchronizing system, in which a trigger signal produced by frequency doubling the horizontal sync signal and frequency dividing the resultant signal by 525 is compared with the vertical sync signal to bring the trigger signal into sync with the vertical sync signal.

6 Claims, 8 Drawing Figures

K. YAMAMOTO
INVENTOR

BY Stevens, Davis, Miller & Mosher
ATTORNEY

VERTICAL SYNCHRONIZING SYSTEM

This invention relates to automatic vertical synchronizing means for television receivers.

In the usual vertical synchronizing system, the vertical sync signal contained in the composite video signal sent out from a broadcasting station is detected by an integrator to produce trigger pulses, thereby locking a vertical oscillator in the receiver in sync with the vertical sync signal. In this type of system, however, a blocking oscillator is present, so that in the circuit design the drift of the free-running frequency of the oscillator should be taken into consideration. Also, in local areas remote from the station the synchronizing signal is only sightly detectable as the electromagnetic field radiated becomes extremely weak, so that the triggering of the oscillator becomes difficult.

Accordingly, the invention is intended to overcome these drawbacks, and an object of the invention is to provide for automatic vertical synchronization to thereby dispense with the sync adjustment knob.

A second object of the invention is to provide a means to bring a signal produced by frequency dividing the horizontal oscillating frequency signal into sync with the vertical sync signal.

A third object of the invention is to provide a circuit, with which it is possible to prevent the malfunctioning of the means mentioned in the second object.

These and other objects, features and advantages of the invention will become more apparent from the following description with reference to the accompanying drawing, in which.

Figure 1:
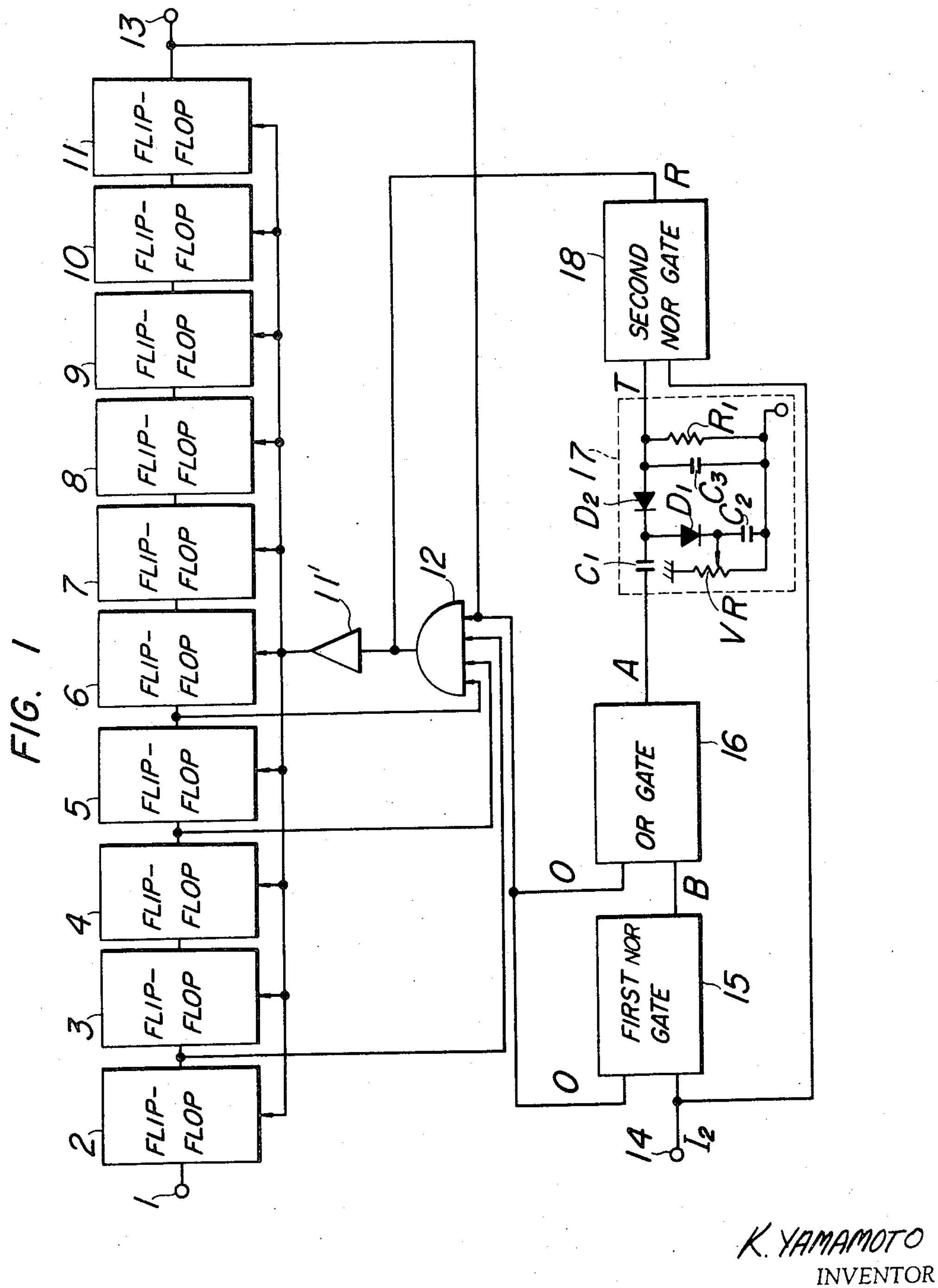
FIG. 1 is a block form representation, partly in schematic, view of an embodiment of the vertical synchronizing system according to the invention.
Figure 3:
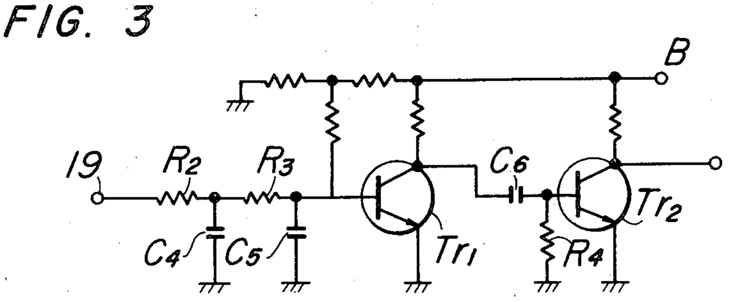
Figure 4:
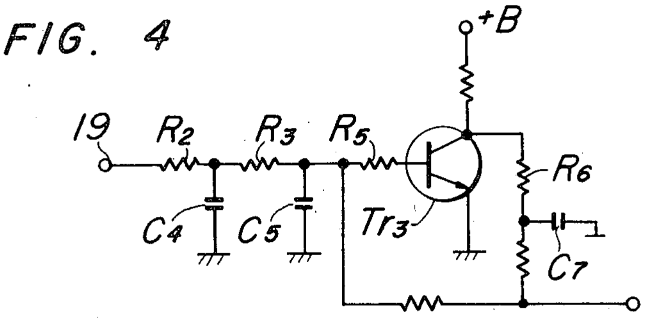
Figure 5:
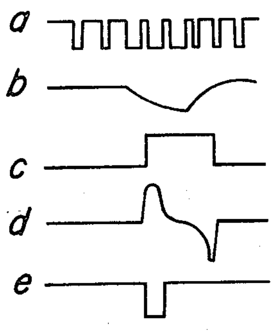
Figure 6:
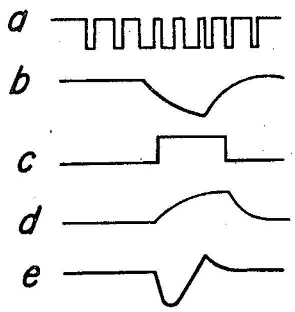

FIGS. 3 and 4 are circuit diagrams showing respective circuits to be added to the circuit of FIG. 1; and FIGS. 5 and 6 show waveforms illustrating the operation of the respective circuits of FIGS. 3 and 4.

Referring now to FIG. 1, an embodiment of the vertical sync circuit according to the invention is shown having an input terminal 1, at which is impressed a signal $I_1$ at double the horizontal sync frequency. The input terminal 1 is connected to a frequency divider consisting of 10 flip-flops 2 to 11 connected in cascade. The outputs of the flip-flops 2, 4, 5 and 11 are also coupled to an AND gate 12, whose output is inverted by an inverter 11′ to provide for the resetting of all the flip-flop stages. In this manner, an output with $2^9 + 13 = 525$ bits appears at output terminal 13. The circuit just described is the usual vertical trigger signal generator using a frequency divider, producing output pulses with width of 13/2 H and at a repetition frequency equal to the vertical sync frequency. These pulses are used to trigger the vertical deflection oscillator. It is herein assumed that one frame consists of 525 horizontal scanning lines. The phase of the above drive signal, however, does not coincide with that of the vertical sync signal. According to the invention, it is intended to bring the former signal into in-phase with the latter.

To this end, the output signal of the frequency divider is fed to a first NOR gate 15 together with the vertical sync signal appearing at another input terminal 14. The output of the NOR gate 15 is then fed together with the output of the frequency divider to an OR gate 16, whose output is in turn fed to a pulse number counter 17. The output of the pulse number counter 17 is then fed together with the vertical sync signal to a second NOR gate 18, whose output is used to reset the flip-flops 2 to 11 so as to render the output at the output terminal 13 into in-phase with the vertical sync signal.

Figures 2A, 2B, 2C:
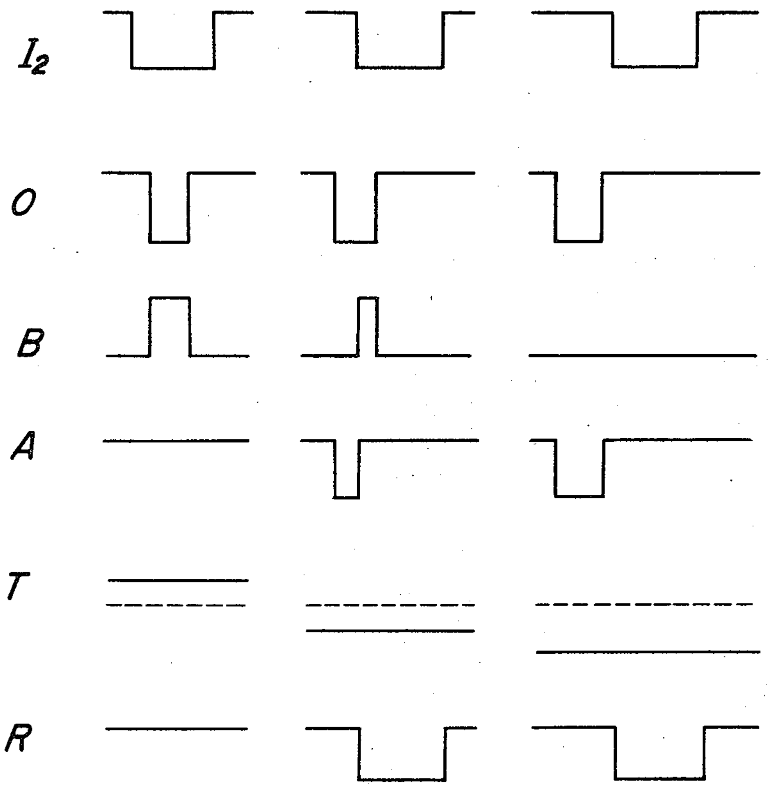
FIGS. 2A–2C show waveforms to illustrate the operation of the system of FIG. 1.

FIG. 2 illustrates the operation of the circuit described above. Waveforms in column 2A result if the two signals $I_2$ and 0 appearing at the respective input terminals 14 and 13 are in phase. Waveforms in column 2B result if both signals are slightly out of phase. Waveforms in column 2C result if both signals are perfectly out of phase. In most cases, both signals will not be at different frequencies, however they will be at the instant the horizontal oscillator frequency deviates from the horizontal sync frequency. The pulse width of the output signal 0 is made smaller than that of the vertical sync signal $I_2$. This is made so, because the vertical sync signal $I_2$ is readily susceptible to noise and so forth and is poorly reliable. Thus, the output pulse as the detection signal from the NOR gate 15 has its pulse width based upon the pulse width of the signal 0. The output A from the OR gate 16, which receives the output signal B of the NOR gate 15 and the signal 0, contains no pulse if the two inputs are in phase. To state in further detail, the OR gate 16 does not provide any output pulse or signal so long as the pulse signal 0 is completely coincident with the vertical sync pulse $I_2$, while it does provide a signal if the former is not completely coincident with the latter. The output of the OR gate 16 is fed to the pulse number counter 17, which comprises capacitors $C_1$, $C_2$ and $C_3$, diodes $D_1$ and $D_2$, a variable resistor VR and a resistor $R_1$. The D.C. input component is removed by the capacitor $C_1$ and is reproduced by the circuit of diode $D_1$, variable resistor VR and capacitor $C_2$. The diode $D_2$ and capacitor $C_3$ take part in smoothing the pulse number. The circuit parameters are set such that $$R_A C_3 >> 1/(2\pi \times 60),$$

where $R_A$ is the impedance to the left of the diode $D_2$. The resistor $R_1$, which is the discharging resistor, is set to have a resistance greater than $R_A$. If the signals $I_2$ and 0 are in phase, the OR gate 16 provides no output signal, so that the counter 17 provides no output. If the signals $I_2$ and 0 are out of phase or at different frequencies, the OR gate 16 produces output pulses. With $n$ pulses ($n$ being an integer) from the OR gate, the level of the output T of the counter 17 gets lower than a threshold value (indicated by the broken line in FIG. 2). As a result, the NOR gate 18 is opened to permit the vertical sync signal $I_2$ as its output R, with which the flip-flops 2 to 11 are reset to render the output thereof into sync with the vertical sync signal $I_2$. The aforesaid number $n$ is usually set to 5 to 10 by appropriately adjusting the variable resistor VR of the counter 17. By so doing, if more than five successive vertical sync pulses vanish due to noise, it is possible to prevent the reset circuit from malfunctioning to bring the frequency divider flip-flop output into phase with the noise despite the fact that the flip-flop output is in correct phase.

The vertical sync signal may be appropriately processed to produce a reset pulse. For correct resetting, however, such a reset pulse should occur within the vertical sync signal period. An example of a circuit to produce such a reset pulse is shown in FIG. 3. FIG. 5 illustrates the operation of this circuit. The vertical sync signal *a* appearing at input terminal 14 is integrated through resistors $R_2$ and $R_3$ and capacitors $C_4$ and $C_5$ into signal *b*, which is impressed upon the base of a transistor $Tr_1$. As a result, the transistor $Tr_1$ produces at its collector a square pulse *c*, which is differentiated through a capacitor $C_6$ and a resistor $R_4$ into signal *d*, which is in turn impressed upon the base of a second transistor $Tr_2$. In this manner, output pulse *e* can be produced. As this output pulse occurs within the vertical sync signal period, it can effect correct resetting. Alternatively, a circuit as shown in FIG. 4 may be used, whose operation is illustrated in FIG. 6. In this circuit, the output *b* of the integrating circuit is impressed through a resistor $R_5$ upon the base of a transistor $Tr_3$, thus producing square pulse *c* at the collector thereof. The square pulse is then differentiated through a resistor $R_6$ and a capacitor $C_7$ into signal *d*, which is combined with the integrator output *b* to produce output signal *e*. As is apparent from the figure, this output signal also takes place within the vertical sync signal period. It is necessary that these reset signal circuits be provided before the NOR gate 18 in FIG. 1.

As has been described in the foregoing, according to the invention it is possible to bring positively the output signal, which is produced by frequency dividing the horizontal sync signal, into sync with the vertical sync signal.

What is claimed is:

1. A vertical synchronizing system for receiving a telecasting wave having horizontal and vertical sync signals comprising a resettable frequency divider circuit for frequency-dividing a signal corresponding to said horizontal sync signal to produce a first signal comparable to said vertical sync signal, means for comparing the phases of said first signal and said vertical sync signal to produce a second signal corresponding to the phase difference therebetween, means for applying said vertical sync signal to said divider circuit to reset said divider circuit, and means for controlling said vertical sync signal applying means in dependence upon the second signal to bring said first signal into phase with said vertical sync signal.

2. A vertical synchronizing system for receiving a telecasting wave having horizontal and vertical sync signals comprising a resettable frequency divider circuit having flip-flops for frequency-dividing a signal corresponding to said horizontal sync signal to produce a first signal comparable to said vertical sync signal, means for comparing the phases of said first signal and said vertical sync signal to produce a second signal when said first signal and vertical sync signal are out of phase, means for producing a third signal depending upon the second signal, means for passing said vertical sync signal as a reset pulse to said divider circuit when said third signal exceeds a predetermined threshold level, and means for resetting said divider circuit by said reset pulse to bring said first pulse into synchronism with said vertical sync signal.

3. The vertical synchronizing means according to claim 2, wherein said means to compare the phase of the output of said frequency divider with respect to the vertical sync signal includes NOR gate to receive the vertical sync signal and the output of said frequency divider and an OR gate to receive the output of said NOR gate and the output of said frequency divider, the width of the vertical sync pulse being made greater than the width of the output pulse of said frequency divider.

4. A vertical synchronizing system for receiving a telecasting wave having horizontal and vertical sync signals comprising a resettable frequency divider circuit having flip-flops for frequency-dividing a signal corresponding to said horizontal sync signal to produce a first signal comparable to said vertical sync signal, means for comparing the phases of said first signal and said vertical sync signal to produce a second pulse signal when said first signal and vertical sync signal are out of phase, means for producing a gating signal depending upon said second pulse signal, means for shaping the waveform of said vertical sync signal to produce a pulse at an earlier instant of the resulting waveform-shaped signal, and gating means for passing the last-mentioned pulse to said divider circuit to reset in dependence upon the gating signal in order to bring said first signal into synchronism with said vertical sync signal.

5. The vertical synchronizing system according to claim 4, wherein said means for shaping the waveform of said vertical sync signal includes an integrating circuit to integrate the vertical sync signal, a first transistor coupled at the base with the output of said integrating circuit to produce a squarewave output at the collector, a differentiating circuit to differentiate said squarewave output, and a second transistor coupled at the base with the output of said differentiating circuit, the collector of said second transistor being connected to an output terminal.

6. The vertical synchronizing system according to claim 4, wherein said means for shaping the waveform of said vertical sync signal includes a first integrating circuit to integrate the vertical sync signal, a transistor coupled at the base with the output of said first integrating circuit to produce a squarewave output at the collector, and a second integrating circuit to receive said squarewave output, the outputs of said first and second integrating circuits being combined to produce an output signal.

* * * * *